United States Patent [19]

Koshoffer et al.

[11] Patent Number: 4,584,834
[45] Date of Patent: Apr. 29, 1986

[54] GAS TURBINE ENGINE CARBURETOR

[75] Inventors: John M. Koshoffer, Forest Park; Edward E. Ekstedt, Montgomery; Billy P. Samuel; Edward I. Stamm, both of Madeira, all of Ohio

[73] Assignee: General Electric Company, Cincinnati, Ohio

[21] Appl. No.: 395,536

[22] Filed: Jul. 6, 1982

[51] Int. Cl.[4] ............................................. F02C 7/22
[52] U.S. Cl. ...................................... 60/737; 60/748; 60/39.821; 239/403
[58] Field of Search .................... 60/748, 737, 39.29, 60/39.821, 39.826, 39.827, 39.828; 239/402, 403

[56] References Cited

U.S. PATENT DOCUMENTS

| | | |
|---|---|---|
| 3,589,127 | 6/1971 | Kenworthy et al. |
| 3,703,259 | 11/1972 | Sturgess et al. |
| 3,736,748 | 6/1973 | Walker et al. ............... 60/39.827 |
| 3,811,278 | 5/1974 | Taylor et al. |
| 3,853,273 | 12/1974 | Bahr et al. |
| 3,899,884 | 8/1975 | Ekstedt. |
| 3,901,446 | 8/1975 | Petreikis, Jr. et al. ............ 60/748 |
| 3,933,133 | 1/1976 | Shekleton ................... 60/743 |
| 3,972,182 | 8/1976 | Salvi. |
| 3,990,834 | 11/1976 | DuBell et al. |
| 4,070,826 | 1/1978 | Stenger et al. |
| 4,105,163 | 8/1978 | Davis, Jr. et al. ............ 60/748 |
| 4,155,220 | 5/1979 | Emory ........................ 60/748 |
| 4,180,974 | 1/1980 | Stenger et al. |
| 4,265,085 | 5/1981 | Fox et al. ..................... 60/733 |
| 4,321,794 | 3/1982 | Etheridge .................... 60/748 |

FOREIGN PATENT DOCUMENTS

| | | |
|---|---|---|
| 1450037 | 9/1976 | United Kingdom. |
| 1478395 | 6/1977 | United Kingdom. |
| 1543032 | 3/1979 | United Kingdom. |
| 2040434 | 8/1980 | United Kingdom. |

OTHER PUBLICATIONS

CF6-50 Advanced Rolled Ring Combustor & Emissions from the 1980 All Operators Mtg. Apr. 15, 16, 17, 1980.
Combustor and High Pressure Turbine from CF6 Review for Air Canada Feb. 15–16, 1979.

Primary Examiner—Carlton R. Croyle
Assistant Examiner—Jeffrey A. Simenauer
Attorney, Agent, or Firm—Francis L. Conte; Douglas S. Foote; Derek P. Lawrence

[57] ABSTRACT

A carburetion assembly including flow control means is provided for controlling a discharge spray angle of a fuel and air mixture thereof. According to one embodiment of the present invention, the flow control means can comprise a plurality of circumferentially spaced apertures in a shroud member which are effective for providing a control portion of compressor airflow in a downstream, axial direction from a swirler stage of the swirler assembly. The apertures provide a predetermined amount of airflow circumferentially about the fuel and air mixture for constraining the mixture and controlling the discharge spray angle thereof.

2 Claims, 4 Drawing Figures

GAS TURBINE ENGINE CARBURETOR

FIELD OF THE INVENTION

This invention relates generally to gas turbine engine combustion systems and, more particularly, to an improved carburetion assembly for mixing fuel and air and discharging the combined flow into a combustor.

BACKGROUND OF THE INVENTION

Carburetion systems in gas turbine engines typically include a plurality of circumferentially spaced carburetion or swirler assemblies located in a dome end of a combustor thereof. Each swirler assembly cooperates with a central fuel injector disposed coaxially upstream therefrom for mixing fuel from the injector and pressurized air from a compressor of the gas turbine engine. The swirler assembly generally includes at least one stage of swirl vanes which are effective for swirling a portion of the pressurized air and mixing this air with fuel from the fuel injector. The combined fuel and air mixture is discharged into the combustor at a selected discharge spray angle with respect to a longitudinal axis of the swirler assembly.

Examples of carburetion systems including swirler assemblies and central fuel injectors are disclosed in U.S. Pat. Nos. 3,899,884 Combustor Systems, 3,589,127 Combustion Apparatus and 3,703,259 Air Blast Fuel Atomizer, all incorporated herein by reference.

In the design of gas turbine engine combustion systems, the effective mixing of fuel and air is a major objective for obtaining more complete combustion. For example, the carburetion system should be capable of obtaining reduced levels of exhaust emissions, such as, carbon monoxide, hydrocarbons, and visible smoke.

The carburetion systems should be also capable of maintaining a predetermined discharge spray angle of the fuel and air mixture. More specifically, when the discharge spray angle is relatively wide, the fuel and air mixture is more likely to impinge upon liners of the combustor and produce hot streaks. These hot streaks are fuel rich regions which cause undesirable local overheating of the liners. Furthermore, the fuel and air mixture is subject to being cooled by the cooling airflow typically provided along the liner surface which can lead to increased exhaust emissions.

When the discharge spray angle is relatively narrow, the result is a fuel rich region located centrally within the combustor. This fuel rich region tends to cause hot streaking at an aft end of the combustor as well as increased exhaust emissions.

In a desirable carburetion system, fuel and air are effectively mixed and injected into the combustor at a predetermined and controlled discharge spray angle. However, inasmuch as the gas turbine engine operates under several modes such as idle and cruise, a typical carburetion system generally represents a compromise for obtaining adequate performance throughout the operating ranges of the gas turbine engine.

For example, varying discharge spray angles from relatively narrow to relatively wide are required throughout the operating ranges of the gas turbine engine. Inasmuch as the swirler assemblies generally comprise fixed structures, they are generally fixed for obtaining an intermediate discharge spray angle providing acceptable performance. Furthermore, for obtaining adequate altitude relight capabilities of the gas turbine engine, a relatively wide discharge spray angle is required at those swirler assemblies located near fuel ignitors of the combustion system. Wide discharge spray angles are typically provided by additional means such as are disclosed in U.S. Pat. Nos. 3,990,834 Cooled Igniter and 4,180,974 Combustor Dome Sleeve, both incorporated herein by reference.

Typical prior art swirler assemblies having central injection fuel nozzles providing fuel thereto include means for constraining axial movement of the swirler assembly while allowing radial movement thereof to accommodate differential thermal radial expansion and contraction of the members thereof. This differential radial expansion and contraction, however, causes the discharge spray angle of the swirler assembly to be translated radially and thereby can additionally cause hot streaking when the discharge impinges the liners of the combustor.

Accordingly, an object of this invention is to provide an improved carburetion assembly for a gas turbine engine.

Another object of this invention is to provide an improved carburetion assembly which reduces the likelihood of hot streaking.

Another object of this invention is to provide an improved carburetion assembly including means for controlling the discharge spray angle of a fuel and air mixture.

Another object of this invention is to provide an improved carburetion assembly wherein hot streaking due to differential thermal radial expansion and contraction of structural elements thereof is reduced.

Another object of this invention is to provide an improved carburetion assembly having improved ignition capabilities.

SUMMARY OF THE INVENTION

A carburetion assembly including flow control means is provided for controlling a discharge spray angle of a fuel and air mixture thereof. According to one embodiment of the present invention, the flow control means can comprise a plurality of circumferentially spaced apertures in a shroud member which are effective for providing a control portion of compressor airflow in a downstream, axial direction from a swirler stage of the swirler assembly. The apertures provide a predetermined amount of airflow circumferentially about the fuel and air mixture for constraining the mixture and controlling the discharge spray angle thereof.

DESCRIPTION OF THE DRAWING

The invention, together with further objects and advantages thereof, is more particularly described in the following detailed description taken in conjunction with the accompanying drawing, in which.

DETAILED DESCRIPTION

Figure 1:
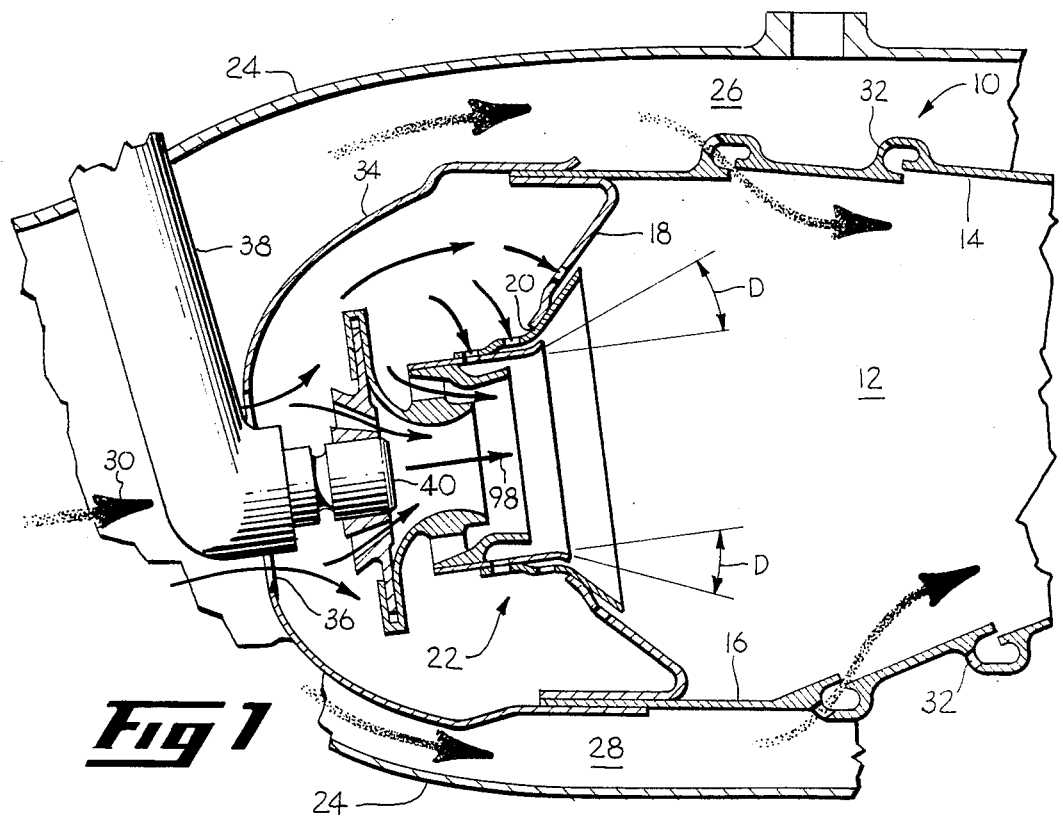
FIG. 1 is a sectional view of an exemplary combustor of a gas turbine engine including a carburetion assembly according according to one form of the present invention.

Referring to FIG. 1, the invention is shown generally as applied to a combustion apparatus of the type suitable for use in a gas turbine engine and comprising a combustor 10 defining a combustion chamber 12 therein. The combustor 10 is generally annular in form and is comprised of an outer liner 14, an inner liner 16 and a domed end or dome 18. The dome 18 of the combustor 10 is formed with a plurality of circumferentially spaced openings 20, each having disposed therein an improved carburetion assembly 22 according to one form of the present invention for the delivery of a fuel and air mixture into the combustion chamber 12.

The combustor 10 may be enclosed by a suitable shell 24, which, together with the outer liner 14 and inner liner 16, define an annular outer passage 26 and an annular inner passage 28, respectively. The outer passage 26 and inner passage 28 are adapted to deliver a portion of a flow of compressor air 30 from a compressor (not shown) into the combustion chamber 12 through suitable apertures 32 disposed in the outer liner 14 and the inner liner 16 for cooling the combustor 10 and diluting gaseous products of combustion in a manner well known in the art. An upstream extension 34 of the combustor 10 is adapted to function as a flow divider, dividing the compressor air 30 between the outer passage 26, the inner passage 28 and an upstream end opening 36 of the extension 34. The end opening 36 fluidly communicates with the improved carburetion assembly 22 of the present invention to provide required air for carburetion.

Delivery of fuel to the combustor 10 is provided by way of a hollow fuel injector 38 which is suitably connected to the shell 24. The fuel injector 38 is curved to fit within the end opening 36 and comprises a fuel passageway formed therein which is effective for supplying liquid fuel to a fuel injector nozzle 40 for subsequent atomization by the carburetion assembly 22 of the present invention.

Figure 2:
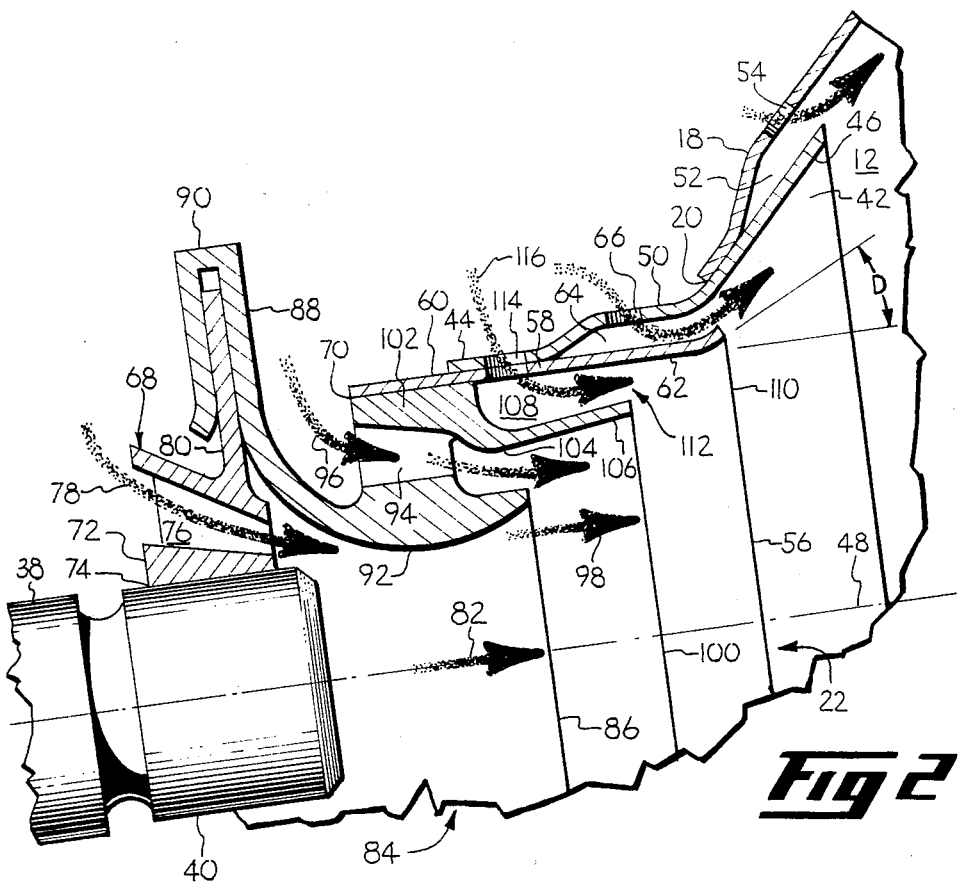
FIG. 2 is an enlarged sectional view of the carburetion assembly of FIG. 1.

Referring to FIG. 2, each dome opening 20 includes a substantially annular transition segment or splashplate 42 suitably secured therein for mounting and blending the carburetion assembly 22 into the dome 18. The splashplate 42 includes a substantially cylindrical forward portion 44 and intermediate portion 50 which extend upstream from the dome opening 20. The splashplate 42 also includes an integral, generally quadrilateral aft portion 46 which extends downstream from the dome opening 20. The aft portion 46 of the splashplate 42 is flared or inclined radially outwardly from a longitudinal axis 48 of the carburetion assembly 22 disposed centrally and perpendicularly through the dome opening 20.

The aft portion 46 of the splashplate 42 is also disposed substantially parallel to and spaced from the dome 18 for defining a splashplate flow channel 52. A plurality of splashplate cooling apertures 54 extend through the dome 18 in flow communication with the flow channel 52 for providing a portion of the compressor air 30 to cool the splashplate 42. A suitable combustor including splashplates 42 and fuel injector 38 is disclosed in U.S. Pat. Nos. 3,899,884 Combustor Systems, incorporated herein by reference.

Referring to FIGS. 1 and 2, the carburetion assembly 22, or simply swirler 22, will be described in more detail. The swirler 22 includes a substantially cyindrical shroud member or barel 56 suitably attached at an intermediate portion 58 thereof to the forward portion 44 of the splashplate 42. The barrel 56 is aligned coaxially with the longitudinal axis 48. The barrel 56 also includes a forward portion 60 extending upstream from the forward portion 44 of the splashplate 42, and an aft portion 62 which extends downstream from the intermediate portion 58 to the aft portion 46 of the splashplate 42. The intermediate portion 50 of the splashplate 42 is disposed substantially parallel to and spaced from the aft portion 62 of the barrel 56 for defining an annular barrel flow channel 64 therebetween. Disposed circumferentially about and through the intermediate portion 50 of the splashplate 42 are a plurality of barrel cooling apertures 66 in flow communication with the barrel flow channel 64 which are effective for providing a portion of the compressor air 30 for cooling the barrel 56.

The swirler 22 also includes an annular first swirler means 68 disposed coaxially about the longitudinal axis 48 and in upstream flow communication with an inlet end 70 of the barrel 56. The first swirler means 68 includes a first annular member 72 having a central opening 74 which axially slidably receives the fuel injector nozzle 40 for channeling fuel from the fuel nozzle 40 into the swirler 22. The first swirler means 68 also includes a plurality of circumferentially spaced first vanes 76 disposed radially outwardly from the first annular member 72. The first vanes 76 are effective for imparting a circumferential swirl to a first portion 78 of the compressor air 30 and directing this air in a substantially axial, downstream direction. The first swirler means 68 further includes an annular flange 80 fixedly secured to the radially outward portion of the plurality of first vanes 76 for mounting the first swirler means 68 to the barrel 56 in a manner to be described below. The first swirler means 68 is effective for mixing fuel from the fuel injector nozzle 40 with the first portion 78 of compressor air 30 for providing a first fuel and air mixture 82 and directing this fuel/air mixture 82 into the inlet end 70 of the barrel 56.

The exemplary swirler 22 illustrated in FIG. 2 comprises a counterrotating swirler and, therefore, also includes a second swirler means 84. The second swirler means 84 is disposed coaxially with and downstream from the first swirler means 68 and is fixedly attached to the forward portion 60 of the barrel 56. The second swirler means 84 includes a second annular member 86 having a central opening which is effective for channeling the first fuel/air mixture 82 further downstream in the barrel 56. The second annular member 86 includes a forward portion 88 which extends in an upstream direction and radially outwardly from the longitudinal axis 48. The forward portion 88 includes a generally U-shaped end portion 90 which faces radially inwardly and receives the annular flange 80 of the first swirler means 68 in radial slidable contact therewith. This arrangement is effective for accommodating differential thermal radial expansions and contractions between the fuel injector 38 and the dome 18 of the combustor 10 to which the swirler 22 is fixedly secured. The second annular member 86 also includes an aft portion 92 having a convex inner surface of reduced diameter for defining a venturi.

The second swirler means 84 also includes a plurality of circumferentially spaced second vanes 94 disposed radially outwardly from the aft portion 92 of the second annular member 86 for imparting a circumferential swirl to a portion 96 of the compressor air 30. The second vanes 94 are preferably made integral with the second annular member 86. The second swirler means 84 is effective for mixing the first fuel/air mixture 82 with the second portion 96 of compressor air 30 and providing a second fuel/air mixture 98.

The swirler 22 also includes a tubular member or annular sleeve 100 having a forward portion 102 which can be integral with the radially outermost portions of the second vanes 94 for rigidly attaching the second swirler means 84 to the forward portion 60 of the barrel 56. The annular sleeve 100 also includes an intermediate portion 104 and an aft portion 106 which extend downstream from the second vanes 94 and are spaced radially inwardly from the intermediate portion 58 of the barrel 56 for defining a flow control channel 108. The intermediate portion 104 of the annular sleeve 100 has a generally convex inner surface of reduced diameter for defining a venturi. The aft portion 106 of the annular sleeve 100 is inclined or flared radially outwardly and axially in a downstream direction.

In operation, fuel from the fuel injector nozzle 40 is mixed with the first portion 78 and the second portion 96 of the compressor air 30 and the resulting second fuel and air mixture 98 is discharged through an outlet end 110 of the barrel 56 into the combustion chamber 12 in a generally frusto-conical spray pattern having a discharge spray angle D from the longitudinal axis 48. The discharge spray angle D can be partly controlled by a proper choice of variables such as first and second swirling means geometry and fuel and air flowrates. However, additional control of the discharge spray angle is desirable.

One improved feature according to the present invention results from the second swirler means 84 being fixedly secured to the barrel 56. This prevents displacements between the second swirler means 84 and the dome 18 due to differential thermal radial expansions and contractions thereof which would otherwise translate the second fuel/air mixture 98 radially inwardly or outwardly toward the inner liner 16 and the outer liner 14, respectively. Accommodation of the differential thermal radial expansion and contraction of the fuel injector 38 and the swirler 22 is provided by the slidable fit of the first swirling means 68, which receives the fuel injector nozzle 40, to the second annular member 86. Although the fuel injector nozzle 40 is allowed to frreely translate radially, the second swirler means 84 is restrained from movement and thereby is effective for reducing the possibility of hot streaking which might otherwise occur.

Another improved feature according to the present invention includes flow control means 112 which are effective for predeterminedly constraining the flow of the second fuel/air mixture 98 to additionally and more precisely control the discharge spray angle D for additionally reducing the possibility of hot streaking. More specifically, the flow control means 112, in one embodiment, includes a plurality of predeterminedly sized and circumferentially spaced control apertures 114 disposed in the intermediate portion 58 of the barrel 56, aft of the first swirler means 68 and the second swirler means 84 in flow communciation with the flow control channel 108. Suitable apertures are also provided in the forward portion 44 of the splashplate 42 in flow communication with the apertures 114.

The control apertures 114 are effective for receiving a control portion 116 of the compressor air 30 and directing this air into the flow control channel 108. The control portion 116 is then discharged without swirling in a substantially axial downstream direction and radially outwardly about the flow of the second fuel/air mixture 98. The amount of the control portion 116 is predetermined for obtaining a selected discharge spray angle D during a desired engine operating condition, such as that which occurs during aircraft cruise. For example, for the particular swirler 22 shown, it has been determined that a control portion 116 of approximately 10% to approximately 20% of the combined flow of the first portion 78, second portion 96 and the control portion 116, i.e., combined swirler airflow, is effective for controlling the discharge spray angle D to a suitable value for reducing, for example, hot streaking. A control portion 116 of approximately 17% of the combined swirler airflow is preferred.

Figure 3:
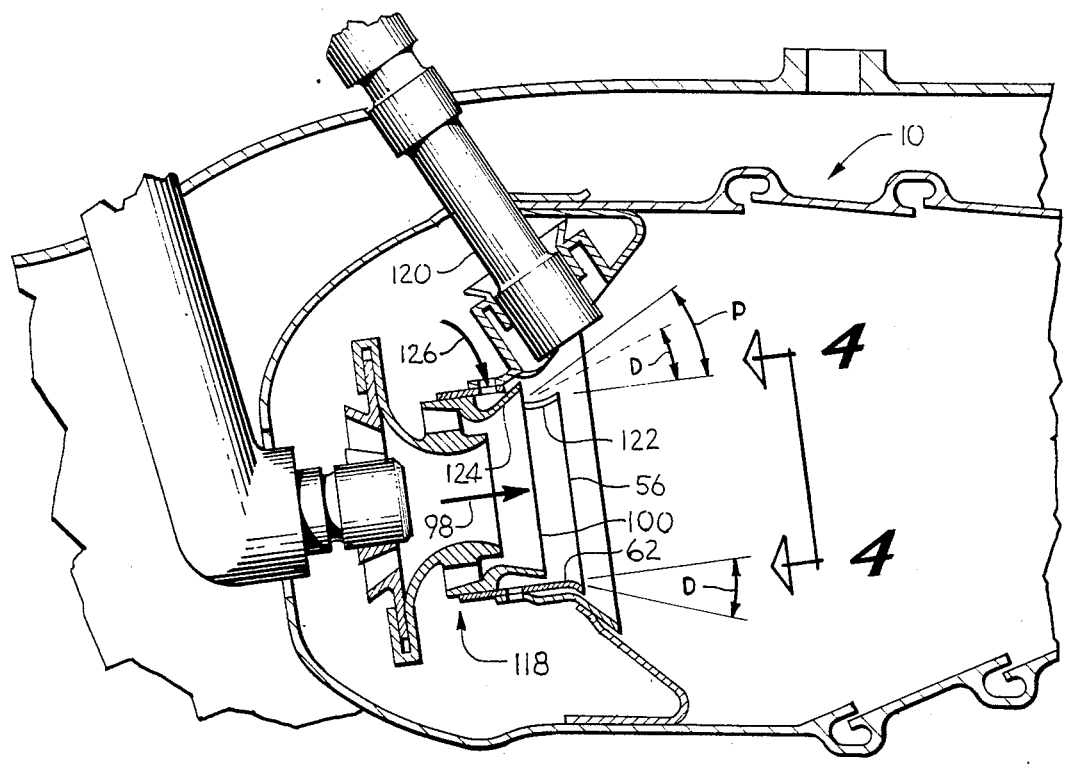
FIG. 3 is a sectional view of a carburetion assembly according to another embodiment of the present invention for use adjacent to a fuel ignitor.

Illustrated in FIG. 3 is another embodiment of the invention which includes a swirler 118 for use adjacent to an ignitor 120. A suitable ignitor 120 and its structural cooperation with a combustor and swirler is disclosed in U.S. Pat. No. 3,990,834 Cooled Ignitor, incorporated herein by reference. The swirler 118 of FIG. 3 is substantially identical to the swirler 22 illustrated in FIGS. 1 and 2 except for those features to be described below.

In addition to the plurality of circumferentially spaced swirlers 22, the combustor 10 can include, for example, two swirlers 118 and ignitors 120. Inasmuch as the swirlers 22 are predeterminedly constructed for providing a preferred discharge spray angle D, a larger discharge spray angle P is preferred at those swirlers 118 adjacent to the ignitors 120 for providing a selected fuel and air ratio and distribution near the ignitor 120. This can be accomplished by diverting the second fuel/air mixture 98 closer to the ignitor 120 to aid in the ignition thereof. Accordingly, the swirler 118 is provided with an arcuate cut-away portion 112 in the aft portion 62 of the barrel 56 facing the ignitor 120. The cut-away portion 122 allows for improved access of the second fuel/air flow 98 to the ignitor 120. Additionally, the annular sleeve 100 includes an arcuate pitcher lip portion 124 at the downstream end thereof which is flared radially outwardly and in an axial downstream direction. The radially outward flare is relatively larger in magnitude than the initial flare of the annular sleeve 100 for locally allowing a larger discharge spray angle P to improve the ignition characteristics, especially altitude relight capability.

It is to be appreciated that the pitcher lip 124 can be used in any swirler assembly for improving ignition capability. A pitcher lip 124 need only be provided in a tubular structure, such as the annular sleeve 100, disposed downstream of the swirler vanes for channelling the fuel/air mixture into a combustor. By having an arcuate aft portion of the annular sleeve flared radially outwardly more than that of the remainder of the circumference of the annular sleeve, the discharge spray angle P of the fuel/air mixture can be controlled adjacent to the ignitor for increasing ignition capability.

Figure 4:
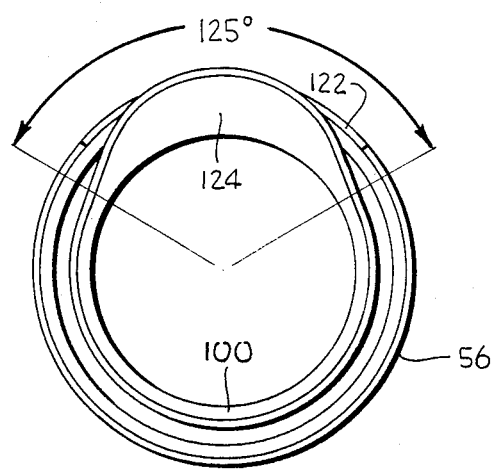
FIG. 4 is an end view taken along line 4—4 in FIG. 3 illustrating an annular sleeve including a locally flared portion for increasing the ignition capability of the carburetion assembly.

Illustrated in FIG. 4 is an end view of the swirler 118 showing the pitcher lip 124 in more detail. The pitcher lip 124 is preferably flared over approximately 125° of the circumference of the annular sleeve 100. Of course, the pitcher lip 124 could extend over as little as, for example, approximately 10° to as much as approximately 180° of the circumference according to any particular design requirements preferred. By flaring only one arcuate portion of the annular sleeve 100, a larger discharge spray angle P is provided only adjacent to the ignitor 120 where desirable. The remainder of the circumference of the annular sleeve 100 is effective for creating the discharge spray angle D and enjoying the benefits attributable thereto.

Whereas a control portion 116 of approximately 17% of the combined swirler airflow is preferred for an exemplary non-ignitor swirler, such as swirler 22 in FIG. 1, a relatively smaller control portion 126 of approximately 13% is preferred for a swirler 118 including the pitcher lip 124.

Accordingly, the use of a swirler 22 and a swirler 118 according to this invention, results in an increase in the control of the flow of the fuel/air mixture and the discharge spray angles thereof for improving carburetion characteristics in the combustor 10.

Although the invention has been described according to one embodiment including a counterrotating swirler 22, other embodiments are apparent from the teachings herein. For example, the flow control means 112 can be provided in any swirler device for controlling the discharge spray angle thereof. A swirler device having only one stage of swirler vanes could include the flow control means 112 disposed downstream therefrom for controlling the discharge spray angle. In such a one stage swirler for use near an ignitor 120, a pitcher lip 124 could be provided in an aft end of the barrel 110 for directing fuel/air mixture toward the ignitor 120.

Although the invention has been described with respect to a swirler having first vanes 76 and second vanes 94 characterized as axial flow swirler vanes, any type of swirler can be used having, such as for example, radial flow swirler vanes.

Furthermore, means can be included to modulate the amount of control flow 116 and 126 for varying the discharge spray angles D and P, respectively, during engine operation, as desired.

Having thus described the invention, what is claimed as novel and desired to be secured by Letters Patent of the United States is:

1. A carburetion assembly for mixing fuel from a fuel nozzle and air from a compressor and channelling the combined fuel and air mixture through an outlet end of a tubular member and adjacent to a fuel ignitor in a combustor of a gas turbine engine wherein:
   said outlet end of said tubular member includes a pitcher lip portion, radially outwardly flared over an arcuate portion of said aft end of said tubular member for directing said fuel and air mixture adjacent to said fuel ignitor.

2. A carburetion assembly for mixing fuel from a fuel nozzle and air from a compressor and delivering the combined fuel and air mixture to a combustor of a gas turbine engine, and for use adjacent to a fuel ignitor in said combustor comprising:
   a generally cylindrical shroud member having an inlet end, an intermediate portion, an outlet end, and a longitudinal axis,
   an annular first swirler means disposed coaxially about said longitudinal axis and in upstream flow communication with said inlet end of said shroud member, said first swirler means including a first annular member having a central opening for channeling said fuel from said fuel nozzle into said inlet end of said shroud member, and a plurality of circumferentially spaced first vanes disposed radially outwardly from said first annular member for mixing a first portion of said air from said compressor with said fuel to provide a fuel and air mixture;
   flow control means effective for receiving a control portion of said air from said compressor and directing said control portion in a substantially downstream direction in said shroud member and circumferentially about said fuel and air mixture for constraining said fuel and air mixture and controlling a discharge spray angle thereof from said outlet end of said shroud member and into said combustor;
   an annular second swirler means disposed coaxially with and axially between said first swirler means and said flow control means in flow communication with said inlet end of said shroud member, said second swirler means including a second annular member having a central opening effective for channeling said fuel and air mixture, and a plurality of circumferentially spaced second vanes disposed radially outwardly from said second annular member for mixing a second portion of said air from said compressor with said fuel and air mixture to provide a second fuel and air mixture, wherein said flow control means controls a discharge spray angle of said second fuel and air mixture; and
   an annular sleeve having a forward end disposed radially outwardly of said second swirler means, and an intermediate portion and an aft portion extending downstream from said second swirler means and spaced radially inwardly from said flow control means to define an annular flow control channel for receiving and channeling said control portion of said air;
   wherein said shroud member has an arcuate cut-away portion at an aft end thereof effective for facing said ignitor, said aft end of said annular sleeve having a pitcher lip portion facing toward said cut-away portion of said shroud member for diverting said second fuel and air mixture toward said fuel ignitor for increasing ignition capability.

\* \* \* \* \*